UNITED STATES PATENT OFFICE.

THOMAS JEWELL, OF ALEXANDRIA COUNTY, VIRGINIA.

MANUFACTURE OF ARTIFICIAL STONE AND MARBLE.

SPECIFICATION forming part of Letters Patent No. 256,000, dated April 4, 1882.

Application filed February 24, 1882. (No specimens.)

*To all whom it may concern:*

Be it known that I, THOMAS JEWELL, of Alexandria county and State of Virginia, have invented a new and useful Improvement in the Composition and Manufacture of Artificial Building, Paving, and Ornamental Stones and Marbles, which processes are fully set forth in in the following specification.

This invention relates to the manufacture of artificial stones, marbles, tiles, and bricks.

In carrying out my invention I take of powdered feldspar, marble-dust, protoxide of lead, pulverized porcelain, wood-ashes, common salt, and boracic acid, one pound each; iron filings, one-half pound, and alum four pounds. The feldspar and porcelain should be saturated with fluoric acid, the marble-dust with acetic acid, and the iron with sulphuric acid. I then saturate the whole mass with a sufficient quantity of lime water to form a thick paste. To this mixture I add the following agglutinants dissolved in their proper solvents: marine glue, three pounds; gum-ammoniac, one-half pound; gum-mastic, one-half pound; gelatine, one pound, and dextrine one pound. This compound should be thoroughly stirred, and before using should be largely diluted with water.

Porcelain is a necessary ingredient in the compound, not only in promoting the hardness of the material and rendering it, in connection with the alkaline substances employed, fire-proof, but crushed to variable degrees of granulation, in combination with broken glass and quartz, it is also useful for mixing with the mortar to impart to the artificial product the granular and micacious appearance belonging to certain classes of natural stone.

The mode of proceeding is as follows: I take of Portland or other hydraulic cement, and clean sharp sand, two parts of the cement to twelve parts of sand. I separate the finer sand from the coarser by sifting, and mix the same in separate trays with the cement, taking the cement and sand in the proportions of one to five of the finer and one to seven of the coarser sand. When it is desired to produce an imitation of granite or other stones having a granular appearance, I add to the finer of the two masses thus prepared—say to one bushel of cement and five of sand—one bushel, in equal quantities, of crushed porcelain, glass, and quartz, thoroughly incorporating the same.

The two separate mixtures are now dampened with the compound, as above described. Then, having the mold of the slab, block, or article to be molded at hand, I place in the same some of the finer material, drawing it well to the sides and bottom of the mold, in order to give a smooth and finished surface to the face and sides of the article to be made, and then fill in with the coarser mixture of cement and sand, ramming the mass tightly into the mold to compact the same. The mold is then removed and the stone left to harden, which process is facilitated by occasionally sprinkling the stone with the dilute compound or solution, as described. The use of porcelain, glass, and quartz for external finishing is confined exclusively to the descriptions of stones referred to. In other cases in which these ingredients are omitted the deficiency may be supplied by adding a like quantity of sand or sand and cement to the mixture.

By this process I am able also to produce a fine smooth brick of any desired color, by adding the necessary coloring-matter, of every variety of form, and with the most elaborate designs on their surfaces, either in bas or demi relief. For this purpose I use with the other ingredients only the finest sharp sand.

For the manufacture of marbles Keen's marble-cement is employed. It is first moistened with the compound or solution, as above described; and colored with such mineral pigments as may be necessary to produce the desired imitation. This material should be used for the facing only of such articles as are usually formed of natural marble, while for the backing of the same the best hydraulic cement and fine sharp sand, thoroughly washed, should be used in the proportion of one part of cement to four of sand as constituting the strongest combination for the purpose.

The manipulations of the materials will depend upon the taste and skill of the operator, and will consist mainly of those adopted in the production of the composition known as "Scagliola."

Having thus described my invention, what I claim, and desire to secure by Letters Patent, is—

1. The compound herein described, consisting of water, feldspar saturated with fluoric acid, marble-dust saturated with acetic acid, iron ilings saturated with sulphuric acid, powdered porcelain saturated with fluoric acid, protoxide of lead, alum, wood-ashes, and common salt, combined with the agglutinants described, as gum-mastic, gum-ammoniac, marine glue, gelatine, and dextrine, dissolved in their proper solvents, substantially as set forth.

2. Artificial stones composed of Portland or other hydraulic cement and sand dampened with the above-described chemical compound and agglutinants, and pressed compactly into suitable molds to secure the desired forms and patterns, as set forth.

3. A composition in imitation of natural marble, consisting of Keen's cement suitably colored, and united and solidified by dampening with the above-described chemical compound and agglutinants, and pressed into form, as fully set forth.

In testimony whereof I affix my signature, in the presence of two witnesses, this 23d day of February, 1882.

THOS. JEWELL.

Witnesses:
JOHN HANCOCK,
E. GRISWOLD,